US005784635A

United States Patent [19]
McCallum

[11] Patent Number: 5,784,635
[45] Date of Patent: Jul. 21, 1998

[54] SYSTEM AND METHOD FOR THE RATIONALIZATION OF PHYSICIAN DATA

[75] Inventor: William J. McCallum, Hurst, Tex.

[73] Assignee: Integration Concepts, Inc., Bedford, Tex.

[21] Appl. No.: 777,796

[22] Filed: Dec. 31, 1996

[51] Int. Cl.[6] .................................................. G06F 7/06
[52] U.S. Cl. .................. 395/800.32; 395/800.36; 395/883; 395/885; 707/522; 707/523; 707/524; 707/908
[58] Field of Search ............... 395/800.32, 800.36, 395/883, 885; 707/522, 523, 524, 908

[56] References Cited

U.S. PATENT DOCUMENTS

| | | | |
|---|---|---|---|
| 4,965,763 | 10/1990 | Zamora | 364/900 |
| 5,235,654 | 8/1993 | Anderson et al. | 382/61 |
| 5,537,586 | 7/1996 | Amram et al. | 395/600 |
| 5,557,780 | 9/1996 | Edwards et al. | 395/500 |
| 5,608,874 | 3/1997 | Ogawa et al. | 395/200.15 |
| 5,704,371 | 1/1998 | Shepard | 128/897 |

OTHER PUBLICATIONS

Internet –DataBridge software product description; located at website: www.hcia.com/products/databridge/product.html.

Internet –HCLA Products and Services; located at website: www.hcia.com/products/.

Internet –1996 Annual Report –Implementation Team Translates Information into Substainable Cost Savings; located at website: www.hcia.com/investor/annual96/imp.html.

Internet –1996 Annual Report –Actionable Information Begins With Standardized Data; located at website: www.hcia.com/investor/annual96/data.html.

Internet –1996 Annual Report –Discussion and Analysis; located at website: www.hcia.com/investor/annual96/overview.html#forward.

Internet –SoleSource; located at website: www.hcia.com/products/solesource.

Internet –Provider Insider –Ambulatory Surgery Database First of Its Kind; located at website: www.hcia.com/newsletters/provider/volliss3/ambuldb.html.

Internet –1995 Annual Report –A Letter to the Shareholders; located at website: www.hcia.com/investor/annual/its.html.

Internet –1995 Annual Report –Corporate Profile; located at website: www.hcia.com/investor/annual/profile.html#products.

Internet –News Release –Oct. 23, 1995; "Transition Systems to Offer Clinical Activity and Cost Benchmarks with HCIA"; located at website: www.hcia.com/investor/news//nr102395.html.

Internet –News Release –Nov. 10, 1995; "HCIA to Acquire Health Care Database Assets From William M. Mercer: Companies to Forge Strategic Alliance"; located at website: www.hcia.com/investor/news/nr111095.html.

(List continued on next page.)

Primary Examiner—Alpesh M. Shah
Assistant Examiner—Dzung C. Nguyen
Attorney, Agent, or Firm—Fulbright & Jaworski L.L.P.

[57] ABSTRACT

A system and method for rationalizing physician data in which source data is collected from source computers located at, for example, physicians' offices, hospitals, testing laboratories and pharmacies. Source data is expected to be in diverse formats and syntax, according to the particular hardware/software/operating system configuration of the source computer. Source data is converted to a common format, advantageously ASCII text, and is parsed and binned into a standard data element "layout." Source data is then cross-referenced and cleaned against standard data resources such as Medicare UPIN tables and AMA ICD9 tables. In this way, analogous data elements acquire a common alphanumeric syntax. Keying errors may also be corrected and missing information may be supplied. Source data is then ready to be accumulated into a standard database of universal format. The database may be processed in various ways to provide reports to physician groups and Independent Practice Associations ("IPAs") to support critical information systems.

16 Claims, 3 Drawing Sheets

OTHER PUBLICATIONS

Internet –News Release –May 15, 1996; "HCIA Acquires Clinical Outcomes Data Company for $6.2 Million in Cash", located at website: www.hcia.com/investor/news/nr051596.html.

Internet –News Release –Jul. 22, 1996; "HCIA Signs Definitive Agreement to Acquire LBA Health Care Management for $130 Million"; located website: www.hcia.com/investor/news/nr072296.html.

Internet –News Release –Aug. 15, 1996; "Cerner Forms Strategic Relationship with HCIA to Support Outcomes Measurement"; located at website: www.hcia.com/investor/news/nr081596.html.

Internet –News Release –Oct. 10, 1996; "HealthGate Data Corp. Announces Agreement with HCIA to Create Internet Information Products"; located at website: www.hcia.com/investor/news/nr101096.html.

Internet –News Release –Nov. 21, 1996; "Equifax Sells to HCIA its Health Analytical Services Unit"; located at website: www.hcia.com/investor/news/nr112196.html.

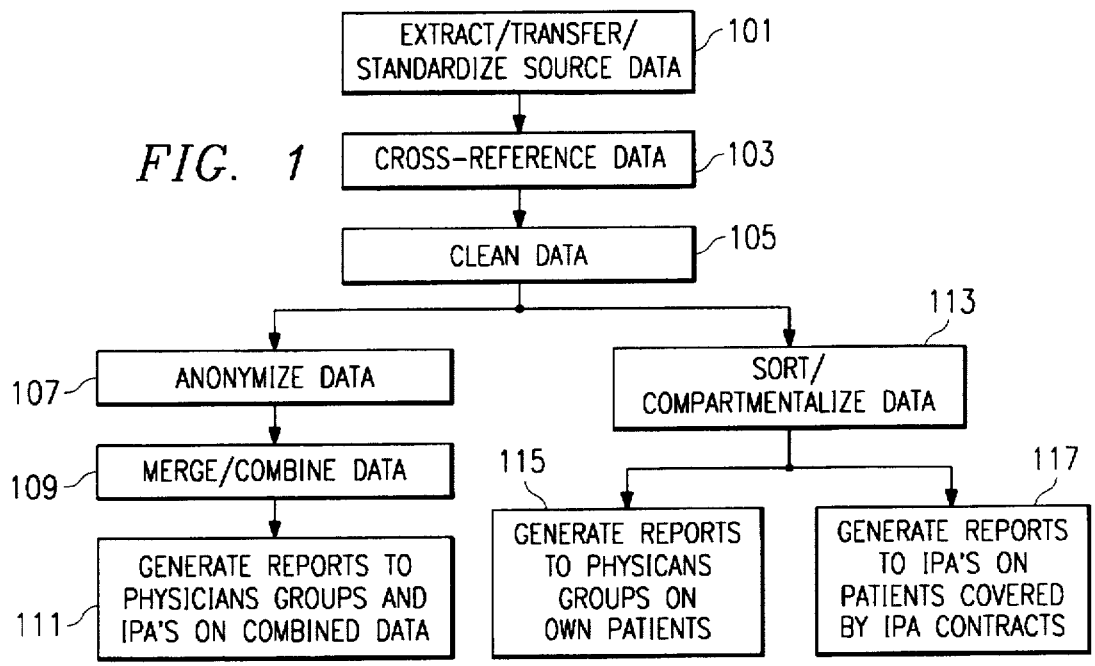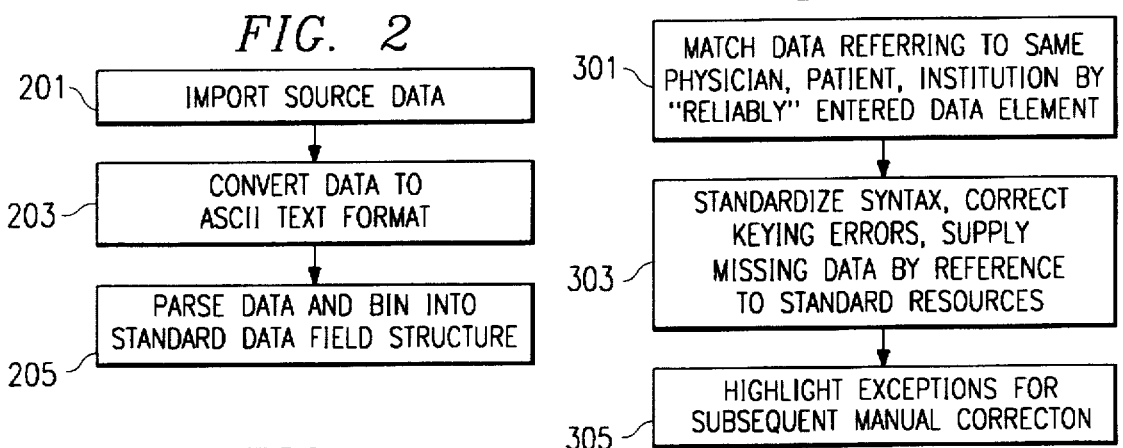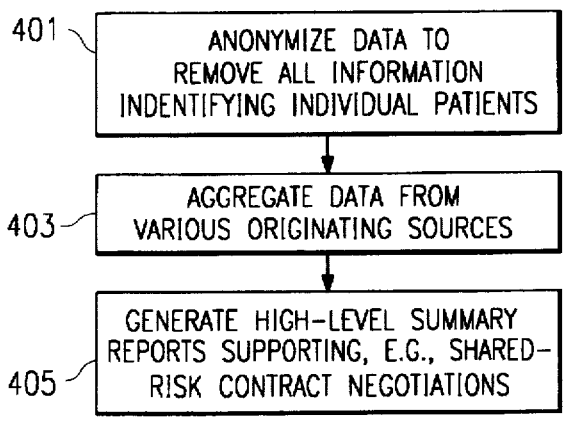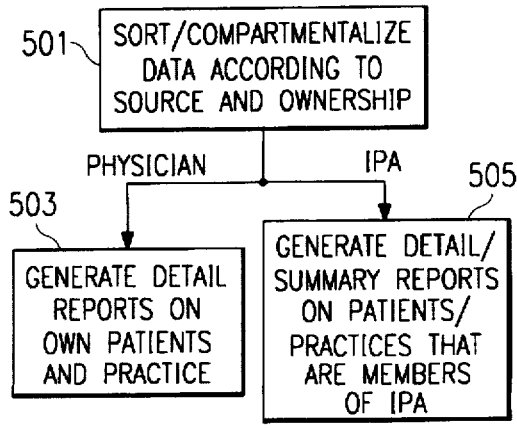

SYSTEM AND METHOD FOR THE RATIONALIZATION OF PHYSICIAN DATA

TECHNICAL FIELD OF THE INVENTION

This invention relates generally to data processing systems, and more specifically to a system and method for assimilating diversely-formatted physician practice data into a universal single-format database to support critical information systems within said practice and among Independent Practice Associations of which said practice may be a member.

BACKGROUND OF THE INVENTION

Physicians today more than ever need accurate and timely information regarding their practices. Not only can improved information systems enhance the quality of the clinical care that the physician can offer, such improved systems can also help the physician to manage and evaluate costs.

The ability to manage and evaluate costs is particularly important in an era when physicians and physicians' organizations are under increasing pressure to reduce the cost of health care. Legislation and consumer demand are recognized to be constraining health insurance premium revenue, causing health insurance companies, government agencies and self-funded employers (or "payors" as they will also be referred to herein) to limit what they will reimburse physicians for care. Meanwhile, the costs of providing health care continue to spiral. As a result, the traditional physician practice is finding it increasingly difficult to be profitable and stay in business.

One alternative being pursued by physicians to manage costs is to contract with a Management Services Organization ("MSO") to manage and run the non-clinical administration of the physician's practice. MSOs bring practice management expertise and economies of overhead scale to a pool of physician groups with which they contract. Within certain constraints, MSOs are also occasionally able to negotiate managed care contracts with health insurance companies for the benefit of the physician groups with which they contract. MSOs generally implement and use sophisticated information systems to facilitate cost management amongst the practices with which they contract. It will thus be seen that the MSO can quite readily accumulate and combine data from various contracting physician groups to support informed decisions regarding overall cost management.

The problem with MSOs for physicians is that they represent a potentially undesirable transfer of power and control by the physician to the MSO over the physician's practice environment. Further, to the extent that the MSO favors implementation of managed care contracts, the physician may also lose control over the type of medicine practiced or the income generated from that practice. Physicians contracting with MSOs nonetheless have access to improved information systems to run their practices, albeit in an MSO environment.

It would thus be highly advantageous to physicians to create a "virtual MSO," wherein the physician in traditional practice receives the benefit of sophisticated information systems to manage costs, but avoids losing control over the practice by contracting with an MSO.

Another recent trend in managing the cost of health care is for payors to contract with physicians and physicians' organizations to share the risk of financial loss. The payor may contract with actual physicians (or practicing groups thereof) or with entities such as Independent Practice Associations ("IPAs") formed specially by otherwise independent physician groups to contract with payors.

In shared-risk contracts, a payor typically requires all of its subscribing insureds to seek care from contracting physicians, but instead of reimbursing the physician (or IPA) for specific care given to a specific patient, the payor instead simply pays the physician (or IPA) a portion of each of its subscribing insured's medical insurance premiums. It is then left by and large up to the physician or IPA to make or lose money based on the total premium revenue received over the total cost of care provided.

It thus becomes critical for physician groups and IPAs contemplating shared-risk contracts to be able to estimate and project expected costs of care, so that they can conduct meaningful and intelligent negotiations with payors for shared-risk contracts. Unfortunately, traditional physician practices are characterized by marginally accurate and reliable information systems. It is a fact that traditional physician-owned data collection systems are designed for fee-based billing, are not compatible with one another or with institutional/payor systems, and are supported by widely diverse hardware, software and operating systems. Further, there has been no historical incentive for traditional physician practices to accumulate data to any particular common level of accuracy or completeness, or in any unitary standard format. Even data entry syntax standards are known to vary widely among individual practices, hindering rationalization of what should be analogous data elements.

As a result, the information systems currently owned by or available to physician groups are generally inadequate to conduct satisfactory evaluations of historical practice costs and patterns. This lack of information handicaps physician groups from entering into intelligent shared-risk contracts with payors. Many physician groups are therefore currently having to rely on practice information supplied to them by the very payors with which they are negotiating shared-risk contracts. This is a situation that is clearly disadvantageous to continued financial survival in a risk-sharing environment.

It would therefore again be highly advantageous for physicians, either in traditional practice or as members of IPAS, to have the benefit of sophisticated information systems to accumulate accurate and reliable practice data to support intelligent share-risk negotiations with payors.

There is, therefore, a need in the art for a system and method by which physicians' existing practice data can be assimilated into a single-format database that may be used by physician groups to support critical information systems. Of course, new and standardized equipment and procedures could be implemented on a wide basis. This would be expensive and cumbersome, and would generate significant training and conversion costs. A better way would be to continue to collect information through physicians' existing data systems and assimilate/standardize/integrate the information remotely. The rationalized information could then be returned at frequent intervals and in a standardized format for subsequent evaluation and use by the physician group or the IPA (collectively, the "user", as will sometimes be referred to herein).

SUMMARY OF THE INVENTION

To meet the above-described needs in the art, a system and method for the rationalization of physician data is disclosed herein. Although the present invention is directed in a preferred embodiment to supporting users' information systems to meet needs as described above, it will nonetheless be understood that the principles of the present invention are not limited to health care applications, and will also apply to information systems in other environments.

According to the present invention, source data is extracted and transferred to a processor. Source data may be collected in any format, exported from various hardware/software/operating system configurations as used in computer systems in, for example, physicians' offices, hospitals and testing laboratories.

Upon receipt, source data is converted into a standard format (advantageously ASCII text format), and then parsed and binned into a standard data structure layout. Data elements likely to have fewer syntax and/or keying errors (such as Unique Physician Identification Number, social security number, etc.) are cross-referenced, and the data may then be cleaned by updating source data against standard resources having reliably accurate information of common alphanumeric syntax.

Source data is now ready for accumulation into a standardized database with uniform data structure and format. This database may be processed to generate both summary and detail reports to support critical information systems used by physician groups and IPAS. Summary reports are "patient-blind", and contain summarized data to be used, for example, to evaluate particular costs of care on a global basis in negotiating intelligent shared-risk contracts. Detail reports include information on specific, identifiable patients and may assist physician groups (and IPAS, where authorized) in managing individual practices better.

It is therefore a technical advantage of the present invention to accumulate source data directly from physicians', hospitals', and laboratories' existing information systems so that users do not have to implement new systems to receive improved management reporting.

It is a further technical advantage of the present invention to empower physician groups with the management information tools of an MSO, while allowing those physician groups to retain independence from the potential administrative and ministerial constraints that MSOs may place on their practices.

It is a yet further technical advantage of the present invention to provide users with sophisticated health care cost information so as to support negotiations for intelligent shared-risk contracts with payors.

It is a still further technical advantage of the present invention to provide physician groups with detailed cost information regarding their patients to facilitate cost and care management in individual practices.

It is a still further advantage of the present invention to equip physician groups (and IPAS, where authorized) with the information necessary to evaluate patient outcome in a sophisticated way. The present invention facilitates analysis of, for example, the comparative outcomes of 100 doctors treating the same condition, and the relative effectiveness of different procedures and medications on that condition. A primary advantage thereby gained is an improvement in the quality of medical care. Ancillary cost advantages are also gained, such as a decrease in recovery time in hospitals and an optimization of the costs of treatment.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 is a block diagram illustrating functional aspects of the present invention at an overview level.

FIG. 2 is a block diagram illustrating functional aspects of the source data collection features of the present invention.

FIG. 3 is a block diagram illustrating functional aspects of source data validation features of the present invention.

FIG. 4 is a block diagram illustrating functional aspects of summary level reporting according to the present invention.

FIG. 5 is a block diagram illustrating functional aspects of detail level reporting according to the present invention.

DETAILED DESCRIPTION OF THE INVENTION

Figure 6:
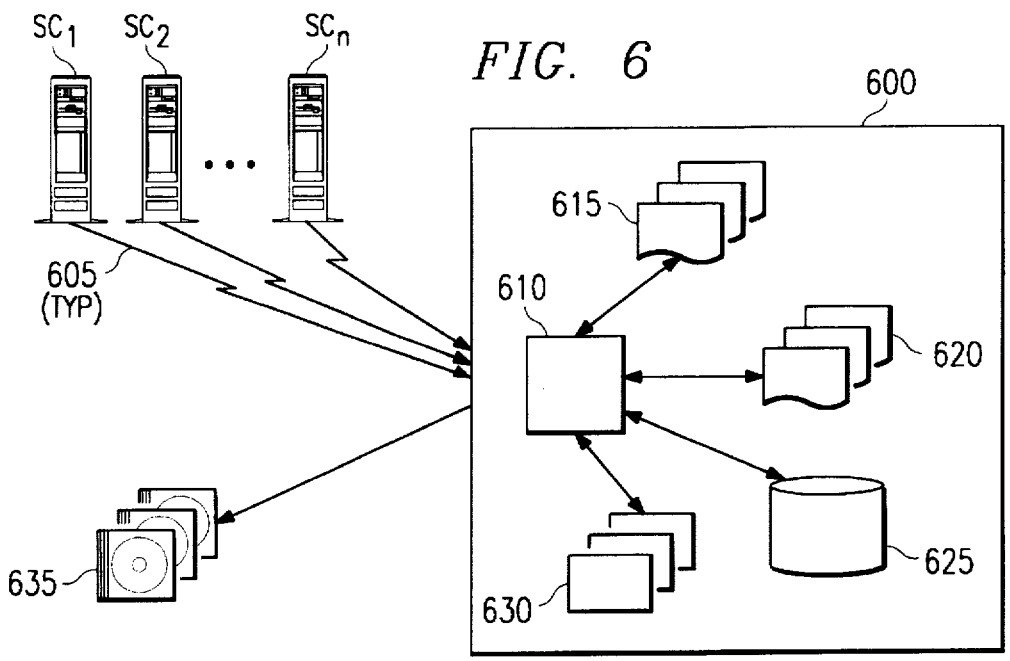
FIG. 6 illustrates exemplary topology and architecture of a processing system on which the present invention may be enabled.

The following description uses several health-care industry acronyms. To assist the reader, these acronyms are summarized here:

AHA—American Hospital Association

AMA—American Medical Association

CPT—Current Procedural Terminology

DRG—Diagnosis Related Group

ICD9—International Classification of Diseases—9th Revision

UPIN—Unique Physician Identification Number

FIG. 1 is a functional block diagram illustrating the present invention at an overview level. The elements of FIG. 1 will be described in greater detail with reference to other illustrations. First, however, to aid understanding of the invention as a whole, each functional block will be described in summary form with reference to FIG. 1.

Source data is first extracted periodically and transferred to a processing center (block 101). In a preferred embodiment, source data is advantageously transferred daily, although this is not a specific requirement. Source data is typically extracted from existing computer-based information systems supporting groups of physicians and other health professionals, as found particularly in doctors' offices, hospitals, testing laboratories, and pharmacists' dispensaries. As a result, source data is expected to be in various, largely incompatible formats, each specific to the hardware/software/operating system environment from which it is extracted. A conversion module standardizes source data into a uniform format (advantageously ASCII text) within a common file structure of recognized data fields (also block 101).

Once standardized, data is then cross-referenced (block 103). This step accounts for the fact that many important data elements, such as date, patient name, address, physician, procedure, and so forth may be have been entered at source in various forms of syntax. It will be appreciated that the syntax of data elements must be as standard as possible to permit accurate sorting, collation, compartmentalization, and summarization of like data. Cross-referencing facilitates this syntax standardization. Physicians are matched using UPIN, patients are matched using social security number, and so forth, so that as far as possible, data referring to the same physician, patient, payor, procedure, etc. are linked regardless of the actual alphanumeric syntax that may have been used during source data entry.

Following cross-referencing, data is next cleaned (block 105). It will be appreciated that source data is likely to contain keying errors, mis-spellings, or other anomalies. Further, although cross-referencing (as described above) enables the linking of like data, syntax variations between like data elements still exist.

The data is therefore cleaned by reference to standardized databases, tables, and other information. For example, data may be compared to the Medicare database of licensed physicians. Cross-reference to the standardized database is made, for example, by UPIN, whereupon the standardized database updates all linked data for that UPIN with identically-disposed alphanumeric information regarding the physician identified by that UPIN. Such standardized and identically disposed information includes physician name, address, practice specialty, and so on. This updating process, thus, not only corrects keying errors and standardizes syntax, but also supplies information in data elements where it may be missing.

Similar data cleaning may be enabled by comparing to other standardized information resources such as AMA ICD9 tables, AMA DRG tables, AMA CPT tables, U.S. postal zip codes, standardized fee schedules, state medical examiners' databases, AMA relative value scales and AHA databases.

The cross-referenced and cleaned data is now ready for processing into formats suitable for reporting back to users. In a preferred embodiment, three types of reports are contemplated to support information systems among users. It will be understood, however, that many other reporting formats and structure are possible, and the present invention presents no limitation on the ways in which cross-referenced and cleaned data may be manipulated and reported.

With reference again to FIG. 1, a first type of report is created at a high level, combining and summarizing data regarding many patients to establish large group indicators (blocks 107, 109, and 111). This type of report is intended for all users to identify trends and indicators on a patient-independent basis. In block 107, the cross-referenced and cleaned data is anonymized. In other words, all information identifying data elements to specific patients (such as patient name, address, social security number) are removed, making the data "patient-blind." The anonymized data is then merged, combined, summarized, and otherwise processed as required to generate the required reports (block 109). Reports are then generated, or data is formatted to be received into reports pulled up on a computer by recipients (block 111).

In a second report type, cross-referenced and cleaned data is left patient specific. The data is sorted, compartmentalized, and otherwise processed so that information pertaining to specific physician/patient encounters is returned to those physicians (blocks 113 and 115). In a third report type, the data is sorted, compartmentalized and otherwise processed so that, where authorized, information pertaining to specific patients is returned to IPAs whose member physicians treat those patients (blocks 113 and 117).

Advantageously, information returned to physicians and IPAs is in a format readable by standard and well-known report analysis software such as MICROSOFT ACCESS. This information may be delivered to its recipients by means known in the art, such as by electronic data transfer or by periodic delivery of mass storage devices such as CD ROMs.

It will thus be seen that a "virtual MSO" is created wherein the user is provided with the information it needs to facilitate cost management or to negotiate intelligent shared-risk contracts, without having to give up control over other aspects of the practice environment.

A more detailed description of the present invention in the context of an enabling preferred embodiment will now be discussed. FIG. 2 illustrates in more detail the data extraction/transfer function shown on block 101 on FIG. 1. In the functional block diagram of FIG. 2, the process begins with import of source data (block 201). Source data may be transferred by any means known in the art, including by electronic data transfer, or by storing data temporarily on a portable mass storage device (such as a diskette, tape or CD-ROM) and then physically transporting same to the processing site. In a preferred embodiment, a daily electronic transfer by ISDN phone lines has been found to supply and enable information processing adequately consistent with the present invention. A preferred embodiment further rejects the use of publicly-accessible wide area data grade networks such as the Internet to transfer data, so as to reduce exposure of confidential data to the possibility of unauthorized disclosure.

Upon receiving the imported source data, it is then converted into a uniform text format (block 203). In a preferred embodiment, this format is ASCII text. Depending on the particular format in which the source data is received, this may involve running the data against conversion engines, or stripping unwanted non-ASCII text formatting characters and codes from the data.

Once in ASCII text format, source data is then parsed and binned into a standard data field structure (block 205). It will be understood that source data may be imported with the data structured in all manners of sequences and file configurations according to the various software, hardware and operating systems of the source data systems that generated the data. Source data must therefore be reorganized into a common data field structure so that data from many different sources may be combined into one database to receive universal processing. This is achieved by running source data against a particular data field conversion engine specifically tailored to the requirements of the source system that generated the data. Each data field conversion engine parses the source data into specific data elements (such as date, patient name, patient address, physician, procedure, etc.) recognized in the source information structure generated by the source information system. Each data element is then binned into a predetermined destination data field located within a common, universal data structure to be used for processing by the present invention. As a result, the common, universal data structure may receive information from many different source data systems (comprising varying hardware, software and operating system configurations), and can then standardize the "layout" of this information in preparation for combining, adapting, summarizing or otherwise processing as desired.

Now in a common, universal format and data structure, source data is ready to be cross-referenced and cleaned, as shown on blocks 103 and 105 on FIG. 1. With reference to FIG. 3, cross-referencing is a step in which source data having common data elements (same patient, same physician, same payor, same hospital, etc.) are linked to facilitate cleanup of the anomalies such as inconsistent syntax, data keying errors, or information missing/omitted. In block 301, cross-referencing of analogous data is enabled by identifying and linking common data elements least likely to have been entered with inconsistent syntax, or to have been entered incorrectly, or to have been omitted. It will be appreciated that dates and individual names of people or places are particularly likely to have been entered at source in a wide variety of syntaxes, and possibly with keying errors and omissions. On the other hand, serial numbers and ID numbers, or street addresses are less likely to have been entered substantially differently. Accordingly, in a preferred embodiment, data referring to the same physician are matched by UPIN, data referring to the same patient or insured party are referred by social security number, and data referring to the same institution (e.g. hospital, insurance company, laboratory, doctor's office) are matched by street address. It will be understood that consistent with the present invention, other strategies of cross-referencing are also possible (e.g. by telephone number), and that the present invention is not limited to the strategy described above.

With further reference to FIG. 3, cross-referenced data is then cleaned by updating it against standard, reliable information resources and tables (block 303). For example, the U.S. Social Security Administration maintains a publicly-available electronic database of UPINs for use in rendering Medicare assistance. The resource is a table of UPINs with the associated physician's name, address and other information in a standard, complete and substantially accurate format. Thus, running cross-referenced data against this resource allows, for all data linked with a common UPIN, the appropriate data fields in that cross-referenced data to be updated with alphanumerically standard and identical data as extracted from the standard resource. In this way, analogous data having inconsistent syntax, keying errors or data omissions may be updated into a uniform alphanumeric syntax.

It will be seen that further data cleaning may be enabled by further reference to other standard resources. For example, American Medical Association ("AMA") tables of ICD9, DRG and CPT may be used to clean up and standardize clinical records. Further, the U.S. Postal Service's tables of addresses and zip codes may be used to clean up and standardize street addresses. Other standard resources, multiple examples of which have been itemized further above, may be used to clean data consistent with the present invention.

Of course, data cleaning cannot be expected to be a perfect remedy. Inconsistent, incorrect or incomplete data are still likely to exist, for example, where no match or update against standard resources was possible. This situation may arise when critical data elements in the data to be cleaned (such as UPIN in the case of the Medicare resource) are not recognized by the standard resource, or are simply missing. In this case, as illustrated on block 305 on FIG. 3, such anomalies are advantageously highlighted in a preferred embodiment as exceptions for later correction. Such exceptions are reported to the source(s) from which they originated (e.g. doctor's office, hospital, laboratory), along with other source-specific information generated by the present invention (refer to block 115 on FIG. 1).

It will be appreciated that the cross-referencing and cleaning processes have now established a database of information from various sources in a substantially universal and standardized format. The data is also now largely complete and uniform as to syntax. This database may now be processed to provide reports to support critical information systems for physicians and IPAS.

It will be appreciated that consistent with database processing known in the art, many different types of reports are available, dependent on the degree of sorting, merging, summarization, combination and other processing performed on the data. Three exemplary types of reporting are enabled in a preferred embodiment as described below with reference to FIGS. 4 and 5. It will nonetheless be appreciated that the types of reporting described are examples, and that the present invention is not limited to just these three types.

With reference to FIG. 4, a first type of reporting is illustrated in which patient-independent characteristics of the data are processed to generate summary reports. Data identified to this type of reporting may be drawn from many different data sources such as doctor's offices, hospitals or testing laboratories. The data is first anonymized (block 401), so that all information referring to a specific identifiable patient is redacted. The redacted information advantageously includes patient's name, address, telephone number, social security number, dependents' identities, etc. The "patient-blind" information may then be aggregated, merged, sorted, combined and otherwise processed to create summary reports to users (blocks 403 and 405).

Of particular importance in this first category of reporting are those reports providing information to physicians and IPAs to support shared-risk contracting. It will be understood that the cost of care on a global basis may now be estimated more precisely, with input from previously unrelated source systems such as providers (including doctors' offices, clinics and hospitals), testing laboratories and pharmacists. This information may be further broken down by clinical procedure, or geographic area, or age group of patients. Depending on the level of detail of the source information captured, it is also possible to estimate costs not only on a dollar basis, but also on a time basis. Such information is extremely valuable to physicians and IPAs in negotiating intelligent shared-risk contracts, because it enables a sophisticated profitability analysis of a payor's offer, especially if that offer includes payment on a per patient, per month basis.

Another useful "global" reporting function enabled in this first category is the ability to evaluate patient outcomes. For example, summary reports may allow analysis of the outcomes of 100 doctors treating the same condition with varying procedures and/or medications. Physicians groups (and IPAs, where authorized) may use this information to optimize effective clinical care, as well as to manage costs better.

FIG. 5 illustrates a second type of reporting, in which patient-specific information is reported to physician groups and IPAS. In contrast to the patient-blind reporting described above with reference to FIG. 4, this second type of reporting informs physician groups and IPAs about their specific patients. It is therefore important, in block 501, to first sort and compartmentalize the data so that, in block 503, physicians groups receive information regarding only their patients, and that, in block 505, IPAS, where authorized, receive information regarding patients of member physicians.

The patient-specific data generated in accordance with FIG. 5 enables physicians to manage their practices, and IPAs to manage their contracting functions, much more cost-effectively. First, as noted above with reference to FIG. 3, patient-specific reports include exceptions where previously-entered data was unable to be cross-referenced or cleaned. Office staff may go back into source data and make manual corrections as required. Collections may also be improved by comparing reported missed charges to invoices, statements and other source documents. Similarly, insurance claims and other receivables over, for example, 30 days old, may be highlighted for follow up.

Similar to the collection of raw source data, reports may be transferred back to physicians by electronic data transfer, or by periodically distributing the information on a portable mass storage device such as a diskette or a CD-ROM. Again, use of the Internet is rejected in a preferred embodiment because of information security concerns.

As already noted, all information is reported to users in a format compatible with commercially popular report-reading software. In a preferred embodiment, information is reported in MICROSOFT ACCESS format, as this applications software has been found to be particularly advantageous in interpreting reported information. It will be nonetheless appreciated that consistent with the present invention, information may be reported in many other formats to suit specifically desired report readers. A further advantage of reporting in a commercially popular format is that in addition to receiving standard predefined reports, users may also use their software to create their own reports to suit particular analytical needs.

The foregoing description has particularized the present invention to a preferred embodiment in which physicians' information systems are supported to enable improved cost and clinical management. Without departing from the spirit and scope of the invention, however, it will be understood that the invention as described herein is equally applicable, without substantial modification, to support information systems used in other professional arenas.

Moreover, it will be understood that the above-described invention may be embodied on software and database technology executable on general purpose computing hardware under operating systems known in the art. It will be nonetheless appreciated that the above-described invention may be enabled by many different hardware, software and operating system configurations known in the art, and the invention as disclosed is not limited to any such configuration. An exemplary configuration used to enable a preferred embodiment is described below with reference to FIGS. 6 through 9.

FIG. 6 depicts system 600 being fed source information by source computers $SC_1$ through $SC_n$ over data links 605. Source computers $SC_1$ through $SC_n$ comprise a wide variety of hardware, software and operating system configurations. Hardware may include IBM, Macintosh, Hewlett-Packard, Data General and many other manufacturers' systems popular in the art. Where source computers are located in physicians' offices, desktop-type computers are likely. In hospitals or laboratories, larger computer systems such as the IBM AS/400 are also likely. Software may include MEDISOFT, MANAGEMENT PLUS, MEDIC and many other popular software systems for running health care information systems. The practice specialty of a particular physician group may further dictate different types of software expected to be used by source computers $SC_1$ through $SC_n$. Hospitals and laboratories may run yet further different software, possibly customized to a particular facility's needs. Operating systems may include DOS, UNIX, WINDOWS, and others.

Data links 605 are advantageously dialup ISDN lines, but may also be other links known in the art.

System 600 runs on a general purpose computer powered by, for example, a Pentium-, Alpha-, Sparc-, MERS- or RISC-based processor. System 600 comprises processor 610, which processes information according to the present invention in combination with memory (not shown) and mass storage device 625. As illustrated on FIG. 6, processor 610 also combines with conversion software 615 and 620, and with standard data resources 630, in enabling system 600 to produce reported information 635, advantageously on CD-ROM.

In receiving source data from source computers $SC_1$ through $SC_n$, an early processing function (as described above) is to convert source data to ASCII text format. In the preferred embodiment illustrated on FIG. 6, this is accomplished with reference to ASCII conversion software 615. Various commercial programs are available to perform this conversion, such as MICROSOFT ACCESS. Customized programs may also need to be developed for source data received in particularly non-standard formats.

Also as described above, parsing/binning conversion software 620 reorganizes the layout of source data into a standard data structure. Customized parsing/binning programs may be developed for each source computer configuration using macro functions on commercially available information processing software such as MICROSOFT ACCESS.

Data cleaning requires updating source data against standard resources 630. In a preferred embodiment, standard resources 630 are stored either in database table form on system 600, or on a portable mass storage device (such as a diskette or a CD-ROM) accessible by system 600. As has also been described above, standard resources 630 advantageously include Medicare UPIN tables, AMA DRG tables, AMA ICD9 tables, AMA CPT tables, U.S. Postal Service zip code tables, and standardized fee schedules.

Figure 7:
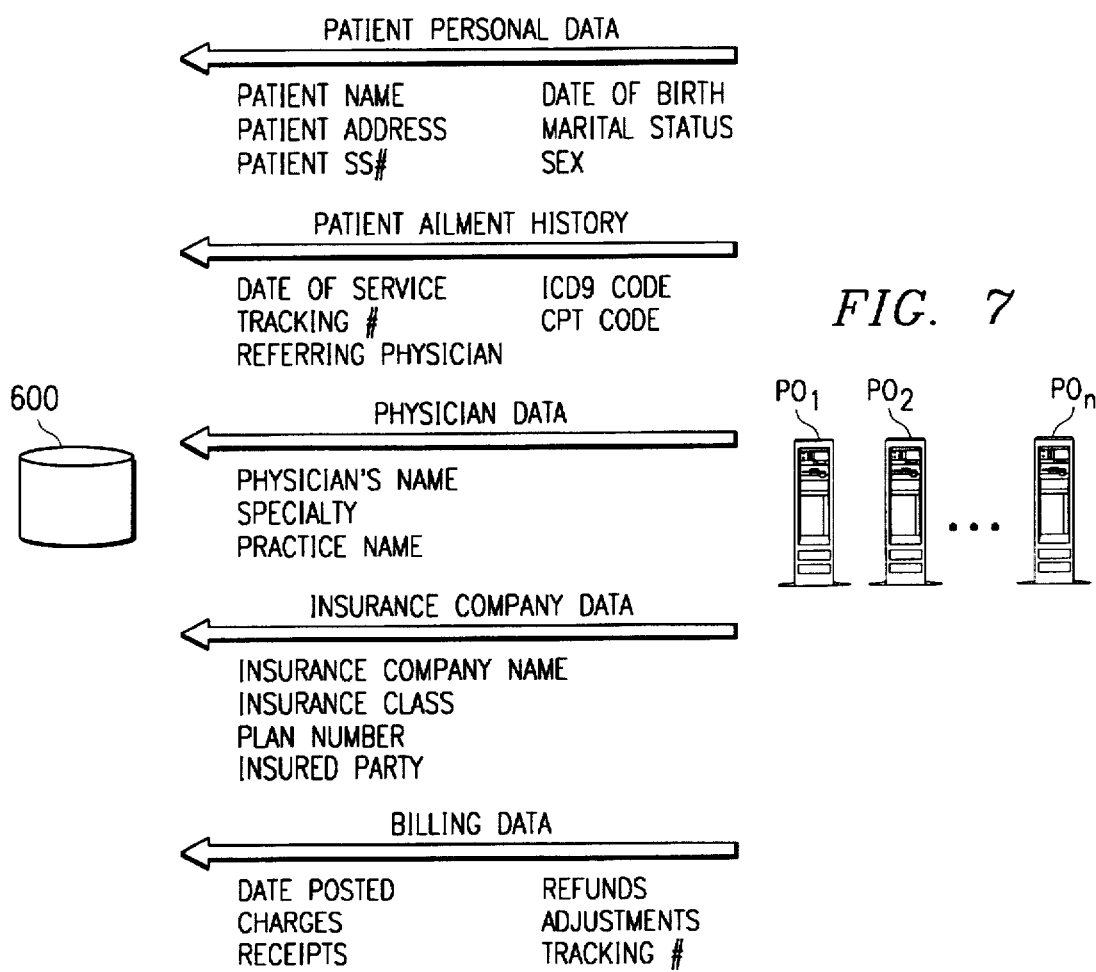
FIG. 7 illustrates exemplary data elements that may be collected by the present invention from physicians' offices.
Figure 8:
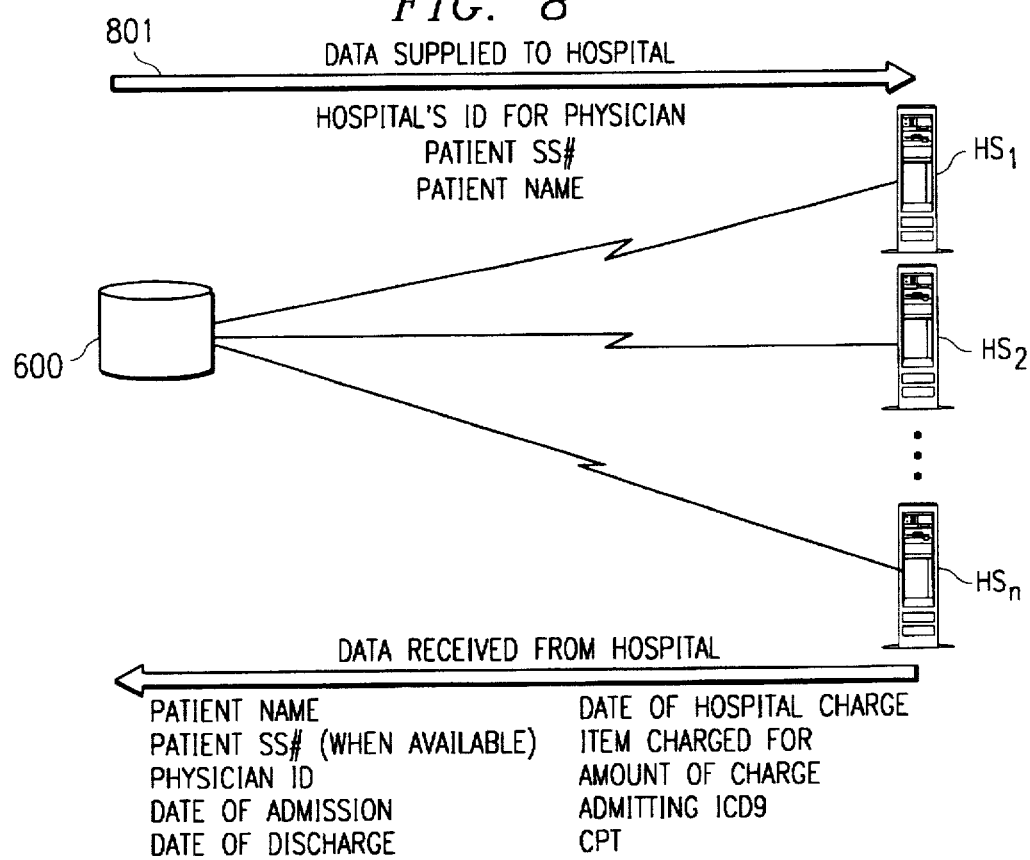
FIG. 8 illustrates exemplary data elements that may be collected by the present invention from hospital systems.
Figure 9:
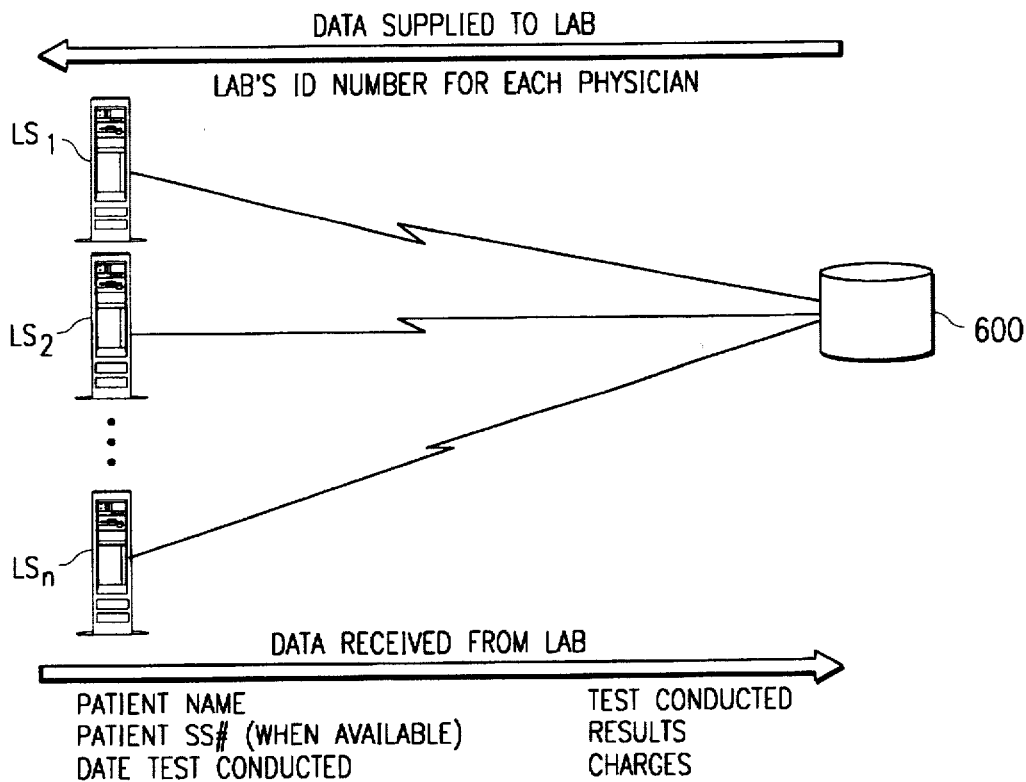
FIG. 9 illustrates exemplary data elements that may be collected by the present invention from laboratory systems.

Turning now to FIGS. 7, 8 and 9, examples of the information that may be processed by the present invention are illustrated. In FIG. 7, exemplary data elements collectable from physicians' office computers $PO_1$ through $PO_n$ are shown categorized into patient personal data, patient ailment history, physician data, insurance company data and billing data.

In FIG. 8, exemplary data elements collectable from hospital systems $HS_1$ through $HS_n$ are illustrated. It will be noted that in contrast to data collection from physicians' offices illustrated on FIG. 6, hospital systems $HS_1$ through $HS_n$ may include large amounts of data not wanted by system 600. Accordingly, a data retrieval key 801 is advantageously first supplied by system 600, whereupon specific information identifiable to that key is then collected.

A similar principle is illustrated on FIG. 9, in which exemplary data elements collectible from laboratory systems $LS_1$ through $LS_n$ are shown. Again, data retrieval key 901 is advantageously supplied first by system 600 so as to prompt collection of only the desired information among the large amount of other, unwanted data expected to be stored on laboratory systems $LS_1$ through $LS_n$.

It will be understood that exemplary data elements collected from source computers as illustrated on FIGS. 7, 8 and 9, once converted, cross-referenced and cleaned into a standard, universal format database, may then be processed to create summary and detail reports as described above to support users' information systems.

Although the present invention and its advantages have been described in detail, it should be understood that various changes, substitutions and alterations can be made herein without departing from the spirit and scope of the invention as defined by the appended claims.

I claim:

1. A system for rationalizing data extracted from a plurality of source systems, said data characterized by a plurality of combinations of data format, data syntax and data element structure, said source systems characterized by a plurality of combinations of hardware, software and operating systems, said system comprising:

means for transferring said data from each of said source systems to a host processor;

means for standardizing said data, said means for standardizing further comprising:

means for converting said data to a uniform format;

means for parsing said data to identify first selected data elements; and means for binning said first selected data elements into a uniform data element structure;

means for cleaning said standardized data, said means for cleaning further comprising:

means for linking data having second selected data elements with recognized equivalent values;

means for comparing said linked data against standard resources, each of said standard resources characterized by a known data structure including a predefined association of a plurality of resource elements having reliably accurate alphanumeric values;

means for matching, by recognized equivalence of value thereof, ones of said second selected data elements with ones of said resource elements, so as to identify matched data elements corresponding with matched resource elements; and means for updating data having said matched data elements, said means for updating data operable by substituting values in third selected data elements therein with values copied from selected resource elements associated with said matched resource elements;

means for adding said cleaned data to a single-format database of uniform data structure; and means for processing data within said database to create output, said output including data combined from a plurality of said source systems, said output further including data specific to individual ones of said source systems.

2. The system of claim 1, in which said standard resources include at least one standard resource selected from the group consisting of:

(a) American Medical Association (AMA) DRG tables;
   (b) AMA ICD9 tables;
   (c) AMA CPT tables;
   (d) U.S. postal service zip code/geographic location tables;
   (e) State medical examiners' databases;
   (f) AMA relative value scales;
   (g) AHA databases;
   (h) Medicare UPIN tables; and
   (i) Standard fee schedules.

3. The system of claim 1, in which said means for processing data, in creating output including data combined from a plurality of said source systems, suppresses values contained in fourth selected data elements.

4. The system of claim 3, in which said fourth selected data elements contain values representing personal details of individual people.

5. The system of claim 1, in which said source systems include at least two computerized information systems selected from the group consisting of:

(a) a physicians' office information system;
   (b) a hospital information system;
   (c) a clinical testing facility information system; and
   (d) a pharmacists' dispensary information system.

6. The system of claim 1, in which said uniform format is ASCII text.

7. A method for rationalizing data extracted from a plurality of source systems, said data characterized by a plurality of combinations of data format, data syntax and data element structure, said source systems characterized by a plurality of combinations of hardware, software and operating systems, said method comprising the steps of:

transferring said data from each of said source systems to a host processor;

standardizing said data, said standardizing step further comprising the substeps of:

converting said data to a uniform format;

parsing said data to identify first selected data elements; and binning said first selected data elements into a uniform data element structure;

cleaning said standardized data, said cleaning step further comprising the substeps of:

linking data having second selected data elements with recognized equivalent values;

comparing said linked data against standard resources, each of said standard resources characterized by a known data structure including a predefined association of a plurality of resource elements having reliably accurate alphanumeric values;

matching, by recognized equivalence of value thereof, ones of said second selected data elements with ones of said resource elements so as to identify matched data elements corresponding with matched resource elements; and updating data having said matched data elements by substituting values in third selected data elements therein with values copied from selected resource elements associated with said matched resource elements;

adding said cleaned data to a single-format database of uniform data structure;

processing data within said database to create output, said output including data combined from a plurality of said source systems, said output further including data specific to individual ones of said source systems; and in creating output including data combined from a plurality of said source systems, suppressing values contained in fourth selected data elements.

8. The method of claim 7, in which said standard resources include at least one standard resource selected from the group consisting of:

(a) American Medical Association (AMA) DRG tables;
   (b) AMA ICD9 tables;
   (c) AMA CPT tables;

(d) U.S. postal service zip code/geographic location tables;

(e) State medical examiners' databases;

(f) AMA relative value scales;

(g) AHA databases;

(h) Medicare UPIN tables; and (i) Standard fee schedules.

9. The method of claim 7, in which said fourth selected data elements contain values representing personal details of individual people.

10. The method of claim 7, in which said source systems include at least two computerized information methods selected from the group consisting of:

(a) a physicians' office information system;

(b) a hospital information system;

(c) a clinical testing facility information system; and (d) a pharmacists' dispensary information system.

11. The method of claim 7, in which said uniform format is ASCII text.

12. A general purpose computer system for rationalizing source data extracted from a plurality of source systems, said source data characterized by a plurality of combinations of data format, data syntax and data element structure, said source systems characterized by a plurality of combinations of hardware, software and operating systems, said general purpose computer system comprising:

a central processing unit including a memory;

input means disposed to receive said source data from each of said source systems;

mass data storage means accessible by the central processing unit and disposed to store data including said source data;

an application program operable to generate output, said output including anonymized data combined from a plurality of said source systems, said output further including data specific to individual ones of said source systems, said application program comprising:

means for converting said source data to a uniform format;

means for parsing said converted data to identify first selected data elements;

means for binning said first selected data elements into a database having a uniform data element structure;

means for recognizing, within said database, second selected data elements having equivalent values;

means for linking data in said database having said second selected data elements with recognized equivalent values;

means for comparing said linked data against standard resources, each of said standard resources characterized by a known data structure including a predefined association of a plurality of resource elements having reliably accurate alphanumeric values;

means for matching, by recognized equivalence of value thereof, ones of said second selected data elements with ones of said resource elements so as to identify matched data elements corresponding with matched resource elements; and means for updating data within said database having matched data elements, said means for updating data operable by substituting values in third selected data elements therein with values copied from selected resource elements associated with said matched resource elements.

13. The general purpose computer system of claim 12, in which the input means includes communications means operable to receive selected source data by electronic data transfer.

14. The general purpose computer system of claim 12, in which said uniform format is ASCII text.

15. The general purpose computer system of claim 12, in which selected ones of said standard resources are stored on the mass data storage means.

16. The general purpose computer system of claim 12, in which said source systems include at least two computerized information systems selected from the group consisting of:

(a) a physicians' office information system;

(b) a hospital information system;

(c) a clinical testing facility information system; and (d) a pharmacists' dispensary information system.

* * * * *